(12) United States Patent
Otani et al.

(10) Patent No.: US 10,502,156 B2
(45) Date of Patent: Dec. 10, 2019

(54) ENGINE CONTROLLER BASED ON ATMOSPHERIC PRESSURE

(71) Applicant: Yanmar Co., Ltd., Osaka-shi, Osaka (JP)

(72) Inventors: Tomohiro Otani, Osaka (JP); Atsuhito Iwase, Osaka (JP)

(73) Assignee: YANMAR CO., LTD., Osaka (JP)

( * ) Notice: Subject to any disclaimer, the term of this patent is extended or adjusted under 35 U.S.C. 154(b) by 100 days.

(21) Appl. No.: 15/121,349

(22) PCT Filed: Feb. 25, 2015

(86) PCT No.: PCT/JP2015/000949
§ 371 (c)(1),
(2) Date: Aug. 24, 2016

(87) PCT Pub. No.: WO2015/129262
PCT Pub. Date: Sep. 3, 2015

(65) Prior Publication Data
US 2016/0363086 A1 Dec. 15, 2016

(30) Foreign Application Priority Data
Feb. 26, 2014 (JP) .................................. 2014-035327

(51) Int. Cl.
*F02D 41/18* (2006.01)
*F02D 41/30* (2006.01)
(Continued)

(52) U.S. Cl.
CPC ........ *F02D 41/3011* (2013.01); *F02D 41/107* (2013.01); *F02D 41/2422* (2013.01);
(Continued)

(58) Field of Classification Search
CPC ............... F02D 41/3011; F02D 41/107; F02D 41/2422; F02D 41/401; F02D 41/1446;
(Continued)

(56) References Cited

U.S. PATENT DOCUMENTS 6,325,050 B1 * 12/2001 Gallagher ............. F02D 31/007
123/478
2012/0130622 A1 5/2012 Yamada

FOREIGN PATENT DOCUMENTS

DE 112011100766 T5 4/2013
EP 1243777 A2 9/2002
(Continued)

OTHER PUBLICATIONS

PCT/JP2015/000949 International Search Report dated Jun. 2, 2015.
(Continued)

*Primary Examiner* — Hai H Huynh
*Assistant Examiner* — Gonzalo Laguarda
(74) *Attorney, Agent, or Firm* — Norton Rose Fulbright US LLP

(57) ABSTRACT

An engine includes a fuel injector, an atmospheric pressure sensor, and an engine controller coupled to the fuel injector. The atmospheric pressure sensor detects the atmospheric pressure. The engine controller includes a first control device and a second control device. The first control device is configured to determine whether the engine is in a steady state or a transient state. The second control device is configured to calculate a fuel injection timing in the steady state, a fuel injection timing in the transient state, and an atmospheric pressure correction process for correcting the fuel injection timing on the basis of the atmospheric pressure. The atmospheric correction process is performed only in the steady state to avoid redundancy. The engine control-
(Continued)

ler outputs a final injection timing to the fuel injector as a result of the calculated fuel injection timing and the calculated atmospheric correction process.

18 Claims, 8 Drawing Sheets

(51) Int. Cl.
  *F02D 41/10*  (2006.01)
  *F02D 41/24*  (2006.01)
  *F02D 41/40*  (2006.01)
  *F02D 41/14*  (2006.01)
(52) U.S. Cl.
  CPC ........ *F02D 41/401* (2013.01); *F02D 41/1446* (2013.01); *F02D 41/1448* (2013.01); *F02D 2200/0406* (2013.01); *F02D 2200/0414* (2013.01); *F02D 2200/703* (2013.01); *Y02T 10/44* (2013.01)
(58) Field of Classification Search
  CPC ......... F02D 41/1448; F02D 2200/0406; F02D 2200/0414; F02D 2200/703; Y02T 10/44
  See application file for complete search history.

(56) References Cited

FOREIGN PATENT DOCUMENTS

| | | |
|---|---|---|
| EP | 1584809 A1 | 10/2005 |
| JP | 62-075050 A | 4/1987 |
| JP | 5-272374 A | 10/1993 |
| JP | H10-318019 A | 12/1998 |
| JP | 11-193737 A | 7/1999 |
| JP | 2000-220501 A | 8/2000 |
| JP | 2011-163251 A | 8/2011 |
| WO | WO 91/02148 A1 | 2/1991 |

OTHER PUBLICATIONS

Office Action in CA 2,939,475, R30(2) Examiner Requisition, dated Jun. 13, 2017, 3 pages.

Extended European Search Report for EP Application No. 15754534.4, dated Oct. 10, 2017, 8 pages.

* cited by examiner

US 10,502,156 B2

ENGINE CONTROLLER BASED ON ATMOSPHERIC PRESSURE

TECHNICAL FIELD

The present invention relates to an engine that controls a fuel injection timing based on a transient state and atmospheric pressure.

BACKGROUND ART

Conventionally, an engine including a common rail or the like that can control a fuel injection timing is known. Patent Document 1 discloses this type of engine.

An engine of Patent Document 1 controls a fuel injection timing depending on the various data. In the following, a configuration of Patent Document 1 will be described with reference to FIG. 6. In Patent Document 1, a standard injection timing map 91 is applied to an engine speed and a fuel injection amount, and thereby the fuel injection timing (standard injection timing) is calculated as the standard. In Patent Document 1, various types of correction amount are added to this standard injection timing, and thereby a final injection timing is calculated.

Here, in an area having low atmospheric pressure such as highlands, the stability of ignition is decreased due to pressure drop within a cylinder (see highlands/steady of FIG. 8). Therefore, in Patent Document 1, an atmospheric pressure sensor detects the atmospheric pressure, and then an atmospheric pressure correction amount map 92 is applied to the detected atmospheric pressure. This can calculate an atmospheric pressure correction amount. This atmospheric pressure correction amount is added to the standard injection timing by an adder 93, and thereby the final injection timing is calculated.

Although Patent Document 1 does not disclose, in the transient state such as in acceleration, the temperature within a cylinder is decreased by a decrease in the temperature of a gas remaining in the cylinder. This leads to a decrease in the stability of ignition. Therefore, at highlands and in the transient state, the pressure within a cylinder is significantly decreased and also the stability of ignition is significantly decreased (see highlands/transient of FIG. 8). Thus, even if the atmospheric pressure is the same, an optimum fuel injection timing is varied depending on the steady or transient state. Therefore, a configuration is known in which the fuel injection timing is calculated by performing processes shown in FIG. 7.

In a block diagram of FIG. 7, the fuel injection timing is calculated in consideration of the engine state (steady or transient state) along with the correction on the basis of the atmospheric pressure. More specifically, a standard injection timing map 94 is applied to the engine speed and fuel injection amount, and thereby the standard injection timing is calculated. Additionally, a transient injection timing map 95 is applied to the engine speed and fuel injection amount, and thereby a transient injection timing is calculated.

A switch 96 outputs the standard injection timing in a case of the steady state, and outputs the transient injection timing in a case of the transient state. In the block diagram of FIG. 7, an atmospheric pressure correction amount map 97 is applied to the atmospheric pressure, and thereby the atmospheric pressure correction amount is calculated. The atmospheric pressure correction amount is added to the outputted value of the switch 96 by an adder 98. In this manner, the final injection timing is calculated.

PRIOR-ART DOCUMENTS

Patent Documents

Patent Document 1: Japanese Patent Application Laid-Open No. 2011-163251

SUMMARY OF THE INVENTION

Problems to be Solved by the Invention

However, in the block diagram of FIG. 7, whether the state is the steady or transient state is not considered in the atmospheric pressure correction amount calculated in the atmospheric pressure correction amount map 97. Thus, the calculated atmospheric pressure correction amount is the same between the steady state and transient state, in a case of the same atmospheric pressure.

As described above, the different fuel injection timing must be set depending on the steady or transient state. However, in a configuration of FIG. 7, the same atmospheric pressure correction amount is set in both steady and transient state. Therefore, misfire may be occurred due to an insufficient correction amount in the steady state, or the allowable value of the pressure in the cylinder may be exceeded due to too large correction amount in the transient state.

The present invention has been made in view of the circumstances described above, and a primary object is to provide an engine that calculates an optimum fuel injection timing depending on a steady or transient state, under a situation of low atmospheric pressure.

Means for Solving the Problems and Effects Thereof

Problems to be solved by the present invention are as described above, and next, means for solving the problems and effects thereof will be described.

In an aspect of the present invention, an engine having the following configuration is provided. That is, this engine includes a fuel injector, a state determination unit, an atmospheric pressure sensor and an injection timing control unit. The state determination unit determines that an engine state is either steady or transient state. The atmospheric pressure sensor detects the atmospheric pressure. The injection timing control unit performs a steady process for calculating a fuel injection timing in the steady state, the transient process for calculating the fuel injection timing in a transient state, and an atmospheric pressure correction process for correcting the fuel injection timing on the basis of the atmospheric pressure. The injection timing control unit changes either whether or not the atmospheric pressure correction process is performed or the contents of the atmospheric pressure correction process, depending on cases when the engine state is the steady or transient state.

Thus, conventionally, the same atmospheric pressure correction amount is calculated in both steady and transient state. It is therefore difficult to avoid either misfire in the steady state or the excess of the pressure in the cylinder over the allowable value in the transient state, however, the adoption of the above-described configuration can avoid the both situations.

The above-described engine is preferably configured as follows. That is, in the steady state, the fuel injection timing calculated in the steady process is corrected in accordance with a first correction amount calculated on the basis of the atmospheric pressure. In the transient state, the fuel injection timing calculated in the transient process is corrected in accordance with a second correction amount calculated on the basis of the atmospheric pressure. The first correction amount and the second correction amount are different from each other.

Accordingly, the correction amount depending on each of the steady state and transient state can be calculated. Therefore, both misfire and the excess of the pressure in the cylinder over the allowable value can be avoided and NOx occurrence can be also suppressed.

The above-described engine is preferably configured as follows. That is, in the steady state, the fuel injection timing calculated in the steady process is corrected in accordance with the correction amount calculated on the basis of the atmospheric pressure. In the transient state, the fuel injection timing calculated in the transient process is used without using the correction amount based on the atmospheric pressure.

Accordingly, both misfire and the excess of the pressure in the cylinder over the allowable value can be avoided by a simple configuration.

In the above-described engine, in a case that the engine state is the transient state and the atmospheric pressure detected by the atmospheric pressure sensor is within a predetermined range, the injection timing control unit preferably uses the fuel injection timing calculated in the transient process without using the correction amount based on the atmospheric pressure.

Accordingly, the above-described control can be performed only in the transient state and within the optimum range of the atmospheric pressure (in a case that there is no problem even if the correction amount based on the atmospheric pressure is disregarded).

EMBODIMENT FOR CARRYING OUT THE INVENTION

Next, an embodiment of the present invention will be described with reference to the drawings. An engine 100 is a diesel engine, and mounted in a working machine, marine vessel or the like.

Figure 1:
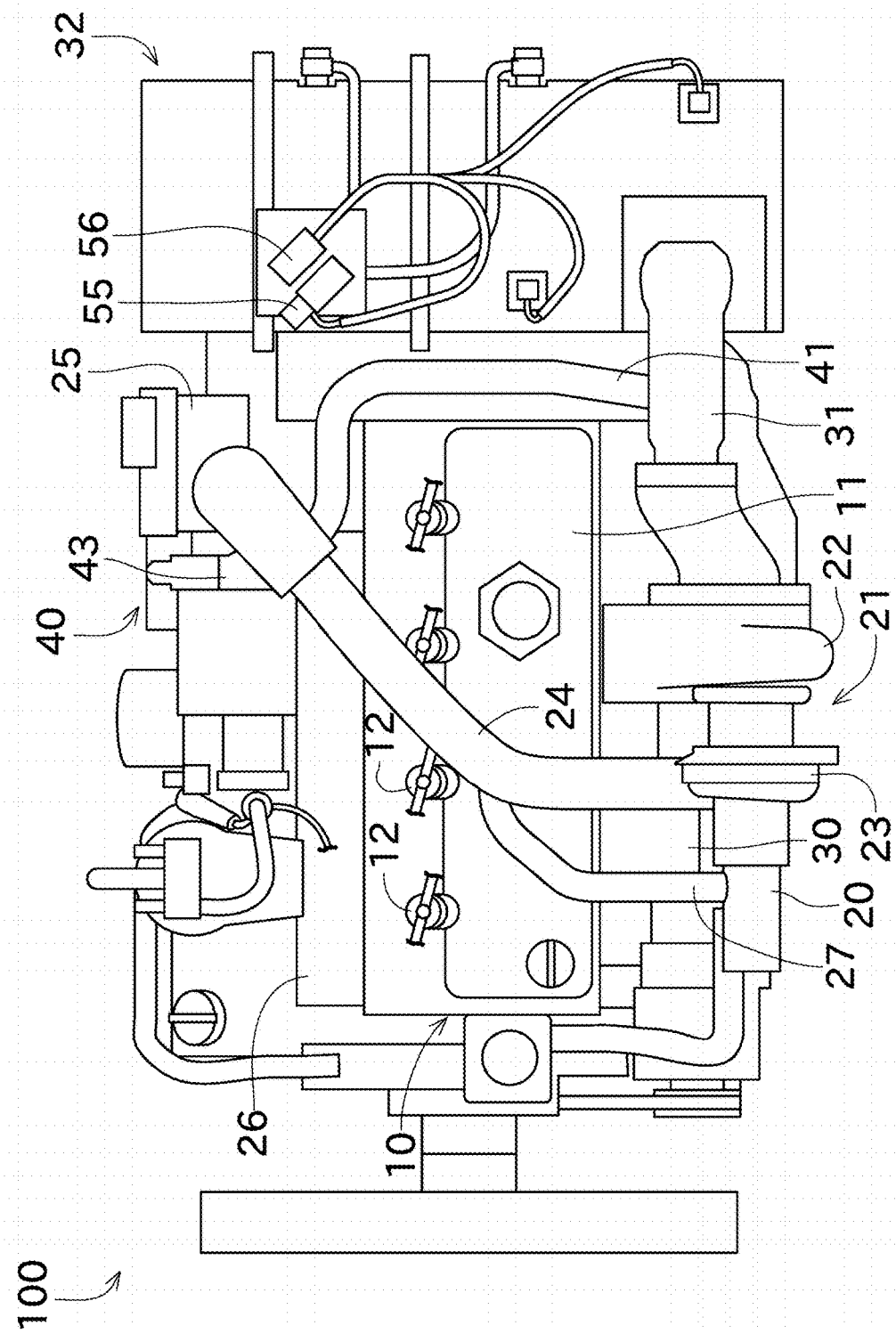
FIG. 1 A schematic plan view of an engine.

As shown in FIG. 1, the engine 100 includes an intake pipe 20, a turbocharger 21, a turbocharging pipe 24, an intake throttle 25, an intake manifold 26 and a breather hose 27, as members of an intake system.

The intake pipe 20 intakes a gas from the outside. The intake pipe 20 has a filter for removing dust or the like in the gas.

The turbocharger 21 includes a turbine housing 22 and a compressor housing 23. A turbine wheel (not shown) within the turbine housing 22 is configured to rotate by using an exhaust gas. A compressor wheel (not shown) within the compressor housing 23 is connected to a shaft 21a (FIG. 2) to which the turbine wheel is also connected, and configured to rotate along with rotation of the turbine wheel. Rotation of the compressor wheel enables the turbocharger 21 to compress air and forcibly inhale air.

The gas sucked by the turbocharger 21 flows through a turbocharging pipe 24. One side of the turbocharging pipe 24 is connected to the turbocharger 21, and the other side of the turbocharging pipe 24 is connected to the intake throttle 25.

The intake throttle 25 includes an intake valve. The intake throttle 25 can change the amount of gas supplied to an at least one cylinder by adjusting the intake valve opening. The gas passed through the intake throttle 25 is transmitted to the intake manifold 26. The intake valve opening is controlled by an ECU (engine control unit) 50 shown in FIG. 2.

The intake manifold 26 divides the gas supplied by the intake throttle 25 into several parts depending on the number of cylinders (4 in this embodiment) and supplies to a cylinder head 10. A cylinder head cover 11 and injectors (fuel injectors) 12 are arranged in the cylinder head 10.

The injectors 12 inject the fuel to an at least one combustion chamber at a predetermined timing. More specifically, the injectors 12 are configured to perform main-injection near top dead center (TDC). The injectors 12 can perform pre-injection for noise reduction just before main-injection, or perform pilot-injection for NOx reduction and noise reduction at a timing further before pre-injection. The injectors 12 can also perform after-injection for PM reduction and the acceleration of the exhaust gas control just after main-injection, or can perform post-injection for the temperature rise or the like at a timing further after after-injection.

Thus, driving an at least one piston by injecting the fuel can generate the power. The blowby gas and exhaust gas are generated in the combustion chamber.

The breather hose 27 supplies the blowby gas generated in the combustion chamber to the intake pipe 20. This can prevent unburned gas from discharging to the outside.

Figure 2:
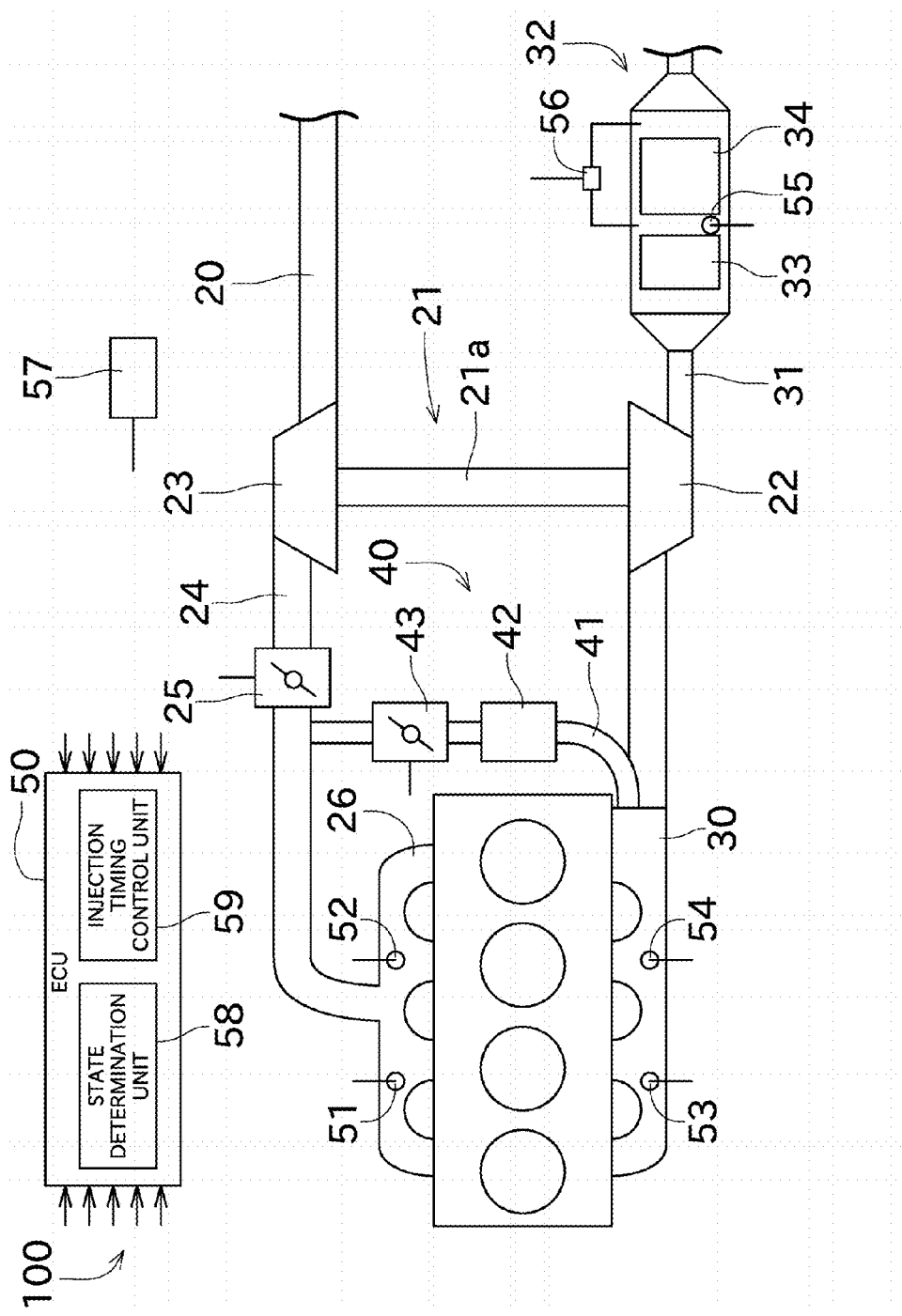
FIG. 2 A schematic diagram for explaining a gas flow and various sensors.

An intake air pressure sensor 51 and an intake air temperature sensor 52 are arranged in the intake manifold 26 as shown in FIG. 2.

The intake air pressure sensor 51 detects the pressure of gas within the intake manifold 26 and then outputs to the ECU 50. The ECU 50 recognizes the inputted pressure as the intake air pressure. The intake air temperature sensor 52 detects the temperature of gas within the intake manifold 26 and then outputs to the ECU 50. The intake air pressure sensor 51 and the intake air temperature sensor 52 may be arranged not in the intake manifold 26 but in further upstream pipe or the like.

The engine 100 includes an exhaust manifold 30, an exhaust pipe 31 and an exhaust emission purification device 32, as members of an exhaust system. This engine 100 having the exhaust emission purification device 32 is especially referred to as the exhaust emission purification system. The exhaust emission purification device 32 may be arranged at some distance from the engine 100.

The exhaust manifold 30 collects the exhaust gas generated in the plurality of combustion chambers and then supplies to the turbine housing 22 of the turbocharger 21. An exhaust pressure sensor 53 and an exhaust temperature sensor 54 are mounted in the exhaust manifold 30.

The exhaust pressure sensor 53 detects the pressure of gas within the exhaust manifold 30 and then outputs to the ECU 50. The ECU 50 recognizes the inputted pressure as the exhaust pressure. The exhaust temperature sensor 54 detects the temperature of gas within the exhaust manifold 30 and then outputs to the ECU 50.

The gas passed through the exhaust manifold 30 and the turbine housing 22 is supplied to an EGR device 40 via an EGR pipe 41, and the remaining gas is supplied to the exhaust emission purification device 32 via the exhaust pipe 31.

The engine 100 includes the EGR device 40 as a member of the intake system and the exhaust system.

The EGR device 40 includes an EGR cooler 42 and an EGR valve 43. The exhaust gas is cooled by the EGR cooler 42. The EGR device 40 can change the amount of the exhaust gas that is supplied to the intake manifold 26 by adjusting the opening of the EGR valve 43. The opening of the EGR valve 43 is controlled by the ECU 50. The ECU 50 adjusts the opening of the EGR valve 43 on the basis of the differential pressure, for example, between the intake air pressure and the exhaust pressure.

The exhaust emission purification device 32 cleans up the exhaust gas and then exhausts it. The exhaust emission purification device 32 includes an oxidation catalyst 33 and a filter 34. The oxidation catalyst 33 that is composed of platinum or the like is the catalyst for oxidizing (combusting) unburned fuel, carbon monoxide, nitric oxide or the like included in the exhaust gas. The filter 34 is, for example, the wall flow type of filter, and collects PM (particulate matter) that is included in the exhaust gas processed in the oxidation catalyst 33.

A temperature sensor 55 and a differential pressure sensor 56 are mounted in the exhaust emission purification device 32. The temperature sensor 55 detects the temperature within the exhaust emission purification device 32. The differential pressure sensor 56 detects the pressure difference between the upstream side of the filter 34 (the downstream side of exhaust of the oxidation catalyst 33) and the downstream side of the filter 34, and then outputs to the ECU 50.

The ECU 50 calculates the amount of PM deposition deposited in the filter 34 on the basis of the detection result of the differential pressure sensor 56. For the method for calculating the amount of PM deposition, as well as using the differential pressure, the oxidation reaction occurred in the exhaust emission purification device 32 is calculated on the basis of such as operation history of the engine 100, and thereby the amount of PM deposition can be calculated.

The engine 100 includes an atmospheric pressure sensor 57 (FIG. 2). The intake air temperature sensor 52 detects the atmospheric pressure and then outputs to the ECU 50.

The ECU 50 controls each part of the engine 100. In the specification, the control of the fuel injection timing will be described expressly. The ECU 50 includes a state determination unit 58 and an injection timing control unit 59 as a configuration for controlling the fuel injection timing. The process performed by them will be described later.

Figure 3:
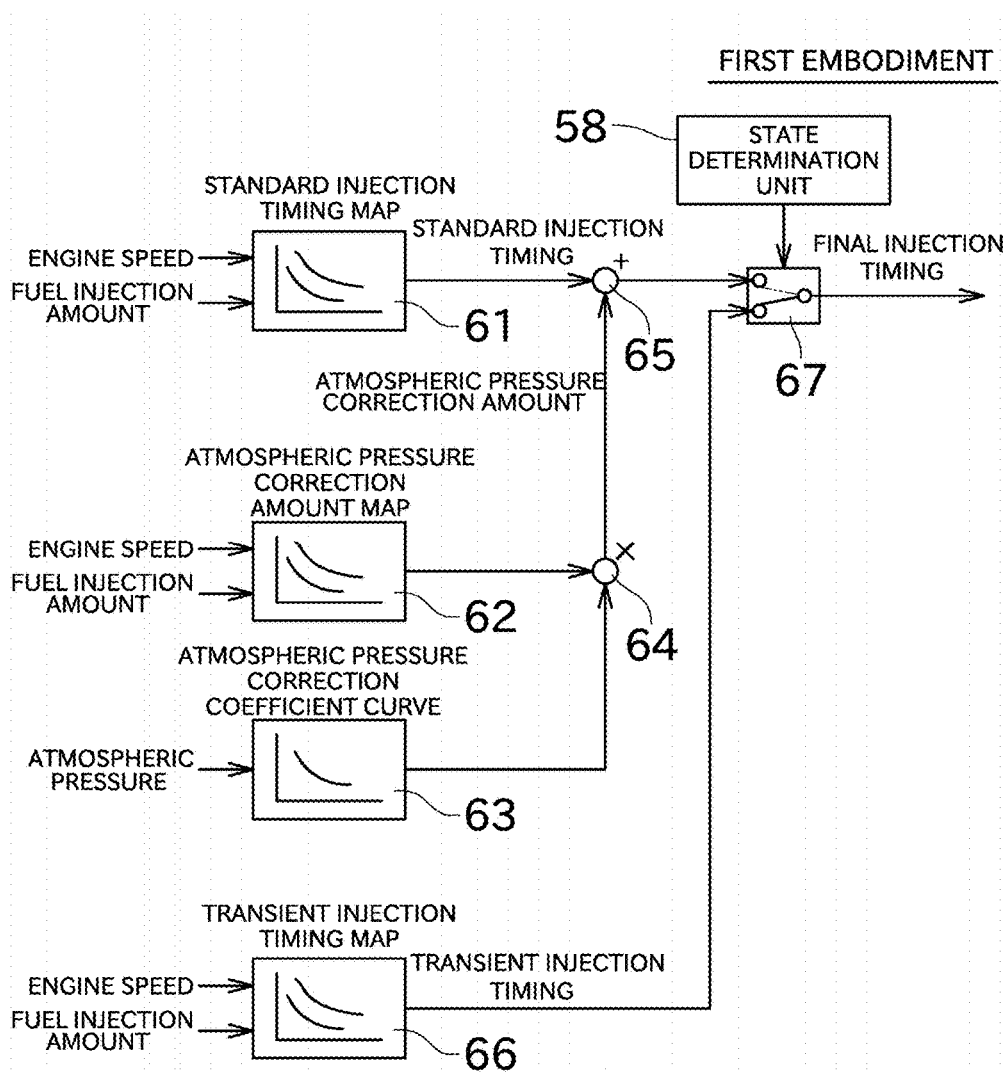
FIG. 3 A block diagram showing a process for calculating a fuel injection timing according to a first embodiment.
Figure 4:
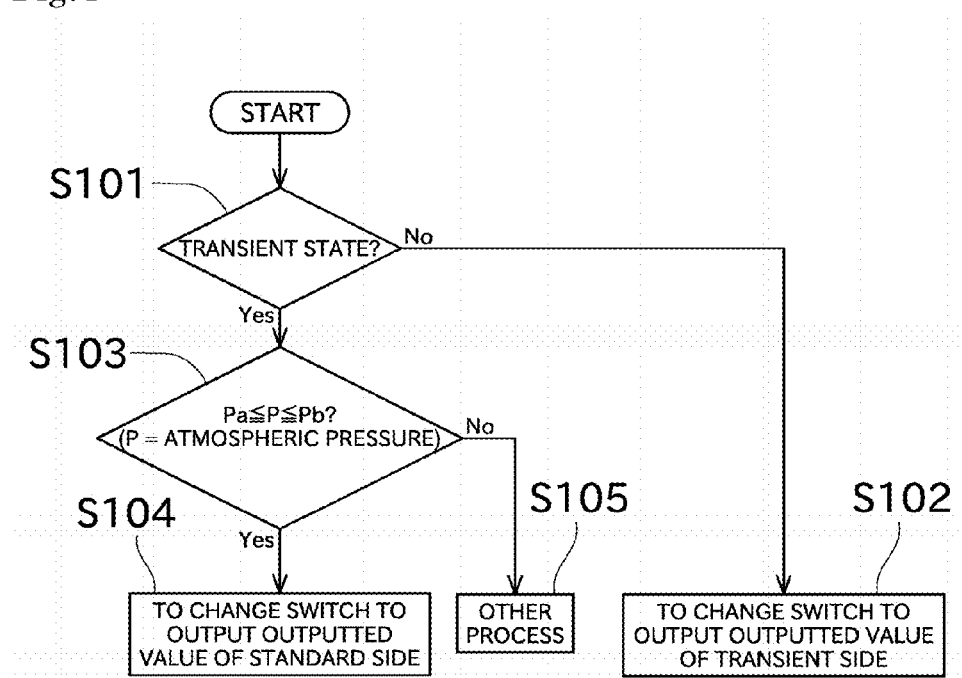
FIG. 4 A flowchart showing a process of a state determination unit according to the first embodiment.

Next, the process for controlling the fuel injection timing will be described with reference to FIG. 3 and FIG. 4. The block diagram shown in FIG. 3 is the functionalized diagram showing the process performed by the ECU 50.

In the ECU 50, a standard injection timing map 61 is applied to the engine speed and the fuel injection amount, and thereby the standard injection timing is calculated (steady process). The standard injection timing is a value as the base of the fuel injection timing when the engine state is the steady state.

In the ECU 50, for considering an influence of the atmospheric pressure, an atmospheric pressure correction amount map 62 is applied to the engine speed and the fuel injection amount and thereby the correction amount is calculated, and also an atmospheric pressure correction coefficient curve 63 is applied to the atmospheric pressure, and thereby the correction coefficient is calculated. Both of calculation results are integrated by an integrator 64, and thereby the atmospheric pressure correction amount is calculated (atmospheric pressure correction process).

The standard injection timing and the atmospheric pressure correction amount are added by an adder 65, and then outputted to a switch 67.

In the ECU 50, a transient injection timing map 66 is applied to the engine speed and the fuel injection amount, and thereby the transient injection timing is calculated (transient process). The transient injection timing is a value as the base of the fuel injection timing when the engine state is the transient state. The transient injection timing is outputted to the switch 67.

The state determination unit 58 performs various determination processes and changes the switch 67 depending on the determination result. In the following, the process performed by the state determination unit 58 will be described with reference to a flowchart of FIG. 4.

The state determination unit 58 firstly determines whether or not the engine state is transient state (S101). This determination is performed on the basis of any one of, for example, the changing amount of an accelerator position, the changing amount of the fuel injection amount and the changing amount of the engine speed.

In a case that the state determination unit 58 determines that the state is not transient state because changing amount is small (that is, determines that the engine state is steady state), the state determination unit 58 changes the switch 67 such that the outputted value in the standard side (the value that the atmospheric pressure correction amount is added to the standard injection timing) is outputted from the switch 67 (S102).

In a case that the state determination unit 58 determines that the state is transient state because changing amount of the accelerator position or the like is large, the state determination unit 58 determines whether or not the atmospheric pressure detected by the atmospheric pressure sensor is within a predetermined range (S103). This process determines the degree of the influence of the atmospheric pressure.

In a case that the atmospheric pressure is within the predetermined range, the state determination unit 58 determines that the influence of the atmospheric pressure is small and then changes the switch 67 such that the outputted value (transient injection timing) in the transient side is outputted from the switch 67 (S104). In a case that the atmospheric pressure is not in the predetermined range, the state determination unit 58 performs the process by using another correction method or the like (S105).

The ECU 50 performs other corrections to a final injection timing outputted by the switch 67 (for example, if turbo lag is occurred, its correction amount is applied), and thereby the injectors 12 or the like are controlled.

In this embodiment, the correction based on the atmospheric pressure is performed only in the steady state, unlike the conventional invention. Accordingly, the correction amount based on the transient state and the correction amount based on the atmospheric pressure are not applied redundantly. This can prevent the excessive advanced ignition timing and prevent the excessive allowable value of the pressure within the cylinder.

Figure 5:
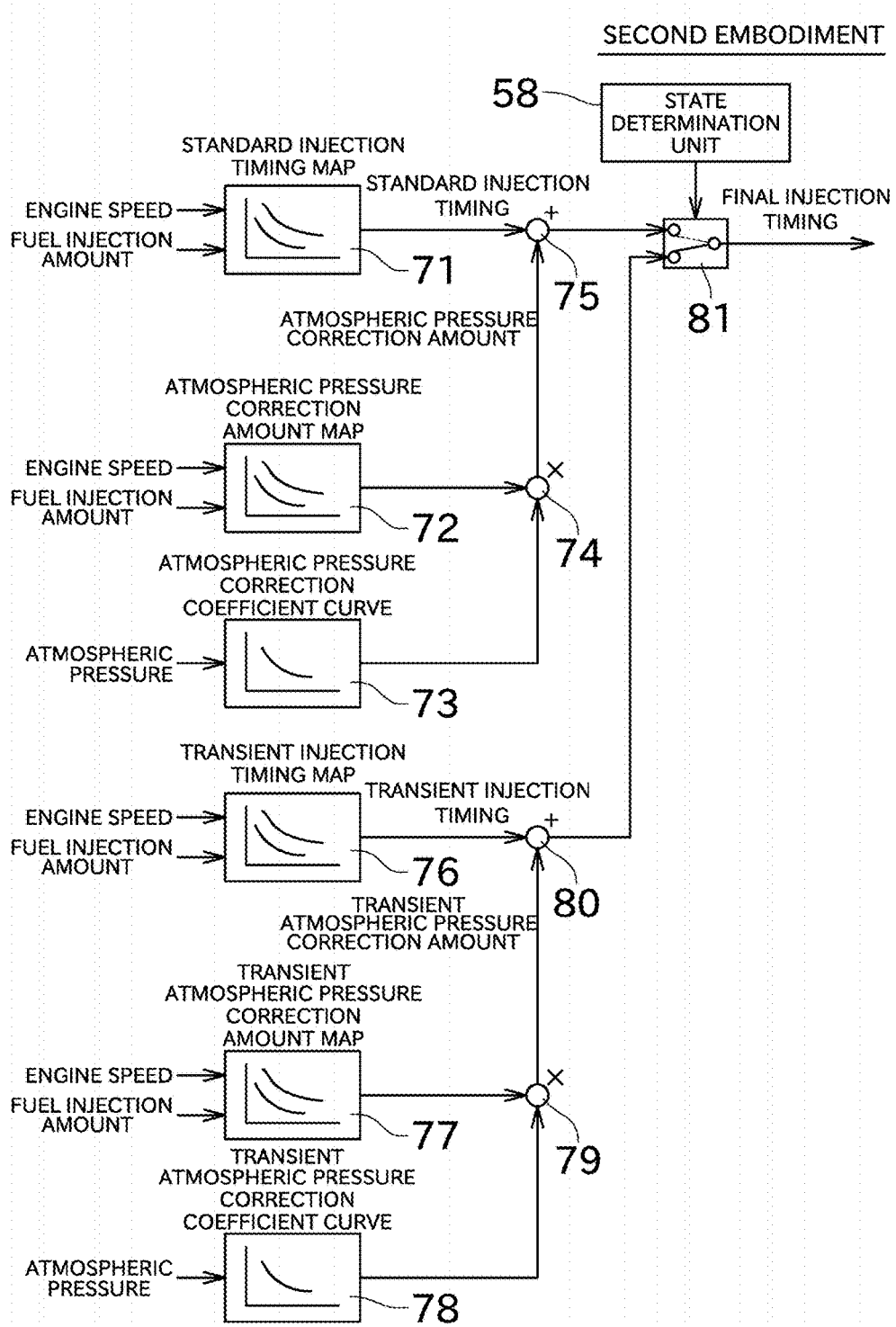
FIG. 5 A block diagram showing a process for calculating the fuel injection timing according to a second embodiment.
Figure 6:
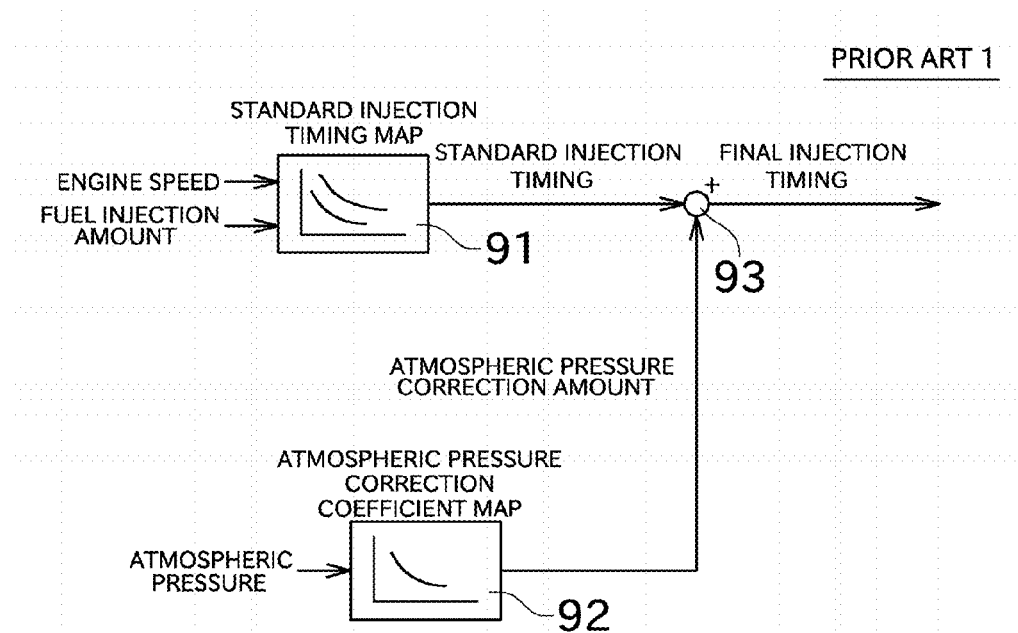
FIG. 6 A block diagram showing a process for calculating the fuel injection timing according to a conventional technique.
Figure 7:
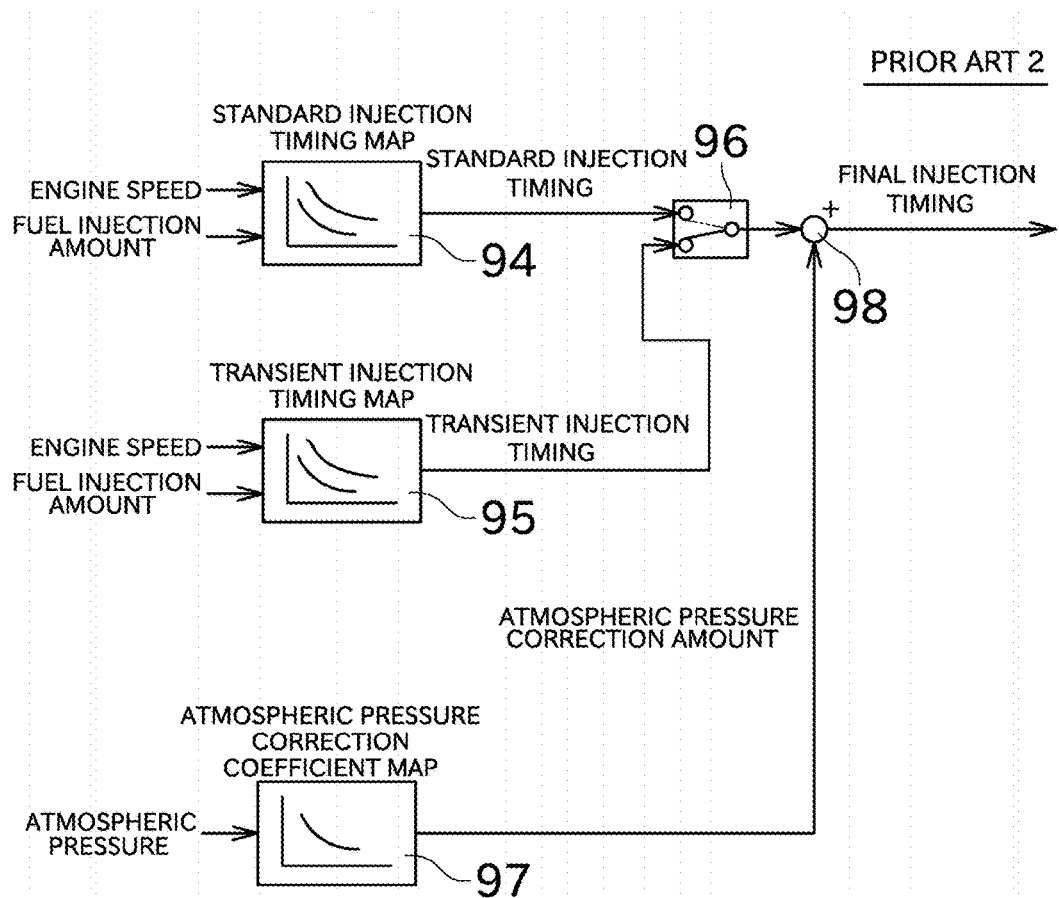
FIG. 7 A block diagram showing a process for calculating the fuel injection timing according to another conventional technique.
Figure 8:
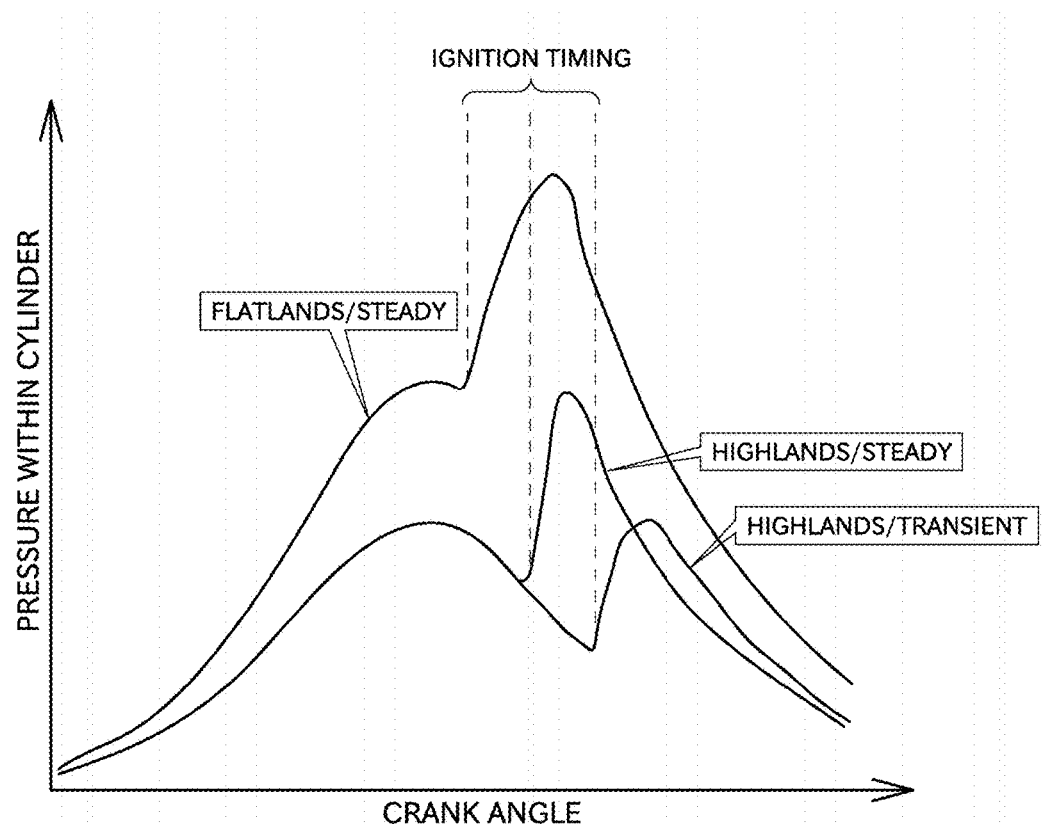
FIG. 8 A graph showing a change of the pressure within a cylinder in a case that an engine state and altitude (atmospheric pressure) are varied.

Next, a second embodiment will be described. The second embodiment is different from the first embodiment, in the respect of performing the correction based on the atmospheric pressure even in the transient state. In the following, specific description will be given with reference to FIG. 5.

Similarly to the above, in the ECU 50, a standard injection timing map 71 is applied to the engine speed and the fuel injection amount and thereby the standard injection timing is calculated (steady process). Similarly to the above, in the ECU 50, the standard atmospheric pressure correction amount map 72 is applied to the engine speed and the fuel injection amount and thereby the correction amount is calculated and also an atmospheric pressure correction coefficient curve 73 is applied to the atmospheric pressure and thereby the correction coefficient is calculated. Both of calculation results are integrated by an integrator 74, and thereby the standard atmospheric pressure correction amount is calculated (atmospheric pressure correction process). The standard atmospheric pressure correction amount map 72 and the standard atmospheric pressure correction coefficient curve 73 are made for the steady state.

The standard injection timing and the standard atmospheric pressure correction amount are added by an adder 75 and then outputted to a switch 81.

Similarly to the above, in the ECU 50, a transient injection timing map 76 is applied to the engine speed and the fuel injection amount and thereby the transient injection timing is calculated (transient process). In the ECU 50, a transient atmospheric pressure correction amount map 77 is applied to the engine speed and the fuel injection amount and thereby the correction amount is calculated and also a transient atmospheric pressure correction coefficient curve 78 is applied to the atmospheric pressure, and thereby the correction coefficient is calculated. Both of calculation results are integrated by an integrator 79, and thereby the transient atmospheric pressure correction amount is calculated (atmospheric pressure correction process). The transient atmospheric pressure correction amount map 77 and the transient atmospheric pressure correction coefficient curve 78 are made for the transient state. Therefore, even when the atmospheric pressure is same, the standard atmospheric pressure correction amount and the transient atmospheric pressure correction amount have different value respectively.

The transient injection timing and the transient atmospheric pressure correction amount are added by an adder 80 and then outputted to a switch 81.

The state determination unit 58 determines whether the engine state is steady or transient state. In a case of the steady state, the state determination unit 58 changes the switch 81 such that the outputted value in the standard side (the value that the standard atmospheric pressure correction amount is added to the standard injection timing) is outputted from the switch 81. On the other hand, in a case that the engine state is transient state, the state determination unit 58 changes the switch 81 such that the outputted value in the transient side (the value that the transient atmospheric pressure correction amount is added to the transient injection timing) is outputted from the switch 81.

In the second embodiment, the determination whether or not the atmospheric pressure is within the predetermined range is not performed since the correction based on the atmospheric pressure is performed even in the transient state.

In this embodiment, the atmospheric pressure correction amount according to the steady state and transient state respectively can be calculated. This can avoid both misfire and the excess of the pressure in the cylinder over the allowable value and suppress NOx occurrence.

In the above-described embodiment, the stability of ignition is improved by adjusting the injection timing. The various processes have known as the process for improving the stability of ignition. For example, low pressure of a common rail enables to suppress evaporation of spraying and therefore suppress latent heat of vaporization. This can improve the stability of ignition.

Accordingly, the engine may be configured as follows. That is, this engine includes a common-rail system, the state determination unit that determines whether the engine state is the steady or transient state, the atmospheric pressure sensor that detects the atmospheric pressure, and a common rail pressure control unit that performs the steady process for calculating the common rail pressure in the steady state, the transient process for calculating the common rail pressure in the transient state, and the atmospheric pressure correction process for correcting the common rail pressure on the basis of the atmospheric pressure. The common rail pressure control unit changes either whether or not the atmospheric pressure correction process is performed or the contents of the atmospheric pressure correction process, depending on cases when the engine state is the steady or transient state.

In the steady state, the common rail pressure control unit may correct the common rail pressure calculated in the steady process in accordance with a first correction amount calculated on the basis of the atmospheric pressure. In the transient state, the common rail pressure control unit may correct the common rail pressure calculated in the transient process in accordance with a second correction amount calculated on the basis of the atmospheric pressure. The first correction amount and the second correction amount may be different.

In the steady state, the common rail pressure control unit may correct the common rail pressure in accordance with the correction amount calculated on the basis of the atmospheric pressure. In the transient state, the common rail pressure control unit may use the common rail pressure calculated in the transient process without using the correction amount based on the atmospheric pressure.

In a case that the engine state is the transient state and the atmospheric pressure detected by the atmospheric pressure sensor is within the predetermined range, the common rail pressure control unit may use the common rail pressure calculated in the transient process without using the correction amount based on the atmospheric pressure.

Instead of the fuel injection timing or common rail pressure, the temperature within the cylinder is increased by increasing the pre-injection amount. This can improve the stability of ignition. The stability of ignition can be also improved by setting the interval of pre-injection shorter. Pilot-injection enables to reduce the injection amount per one injection and therefore the temperature of spraying can be increased. This can improve the stability of ignition.

The engine may be configured as follows. That is, this engine includes the state determination unit that determines whether the engine state is the steady or transient state, the atmospheric pressure sensor that detects the atmospheric pressure, and the fuel injection control unit that performs the steady process in the steady state for calculating "either whether or not pre-injection and pilot-injection are performed or the injection amount and injection timing if performed", the transient process in the transient state for calculating "either whether or not pre-injection and pilot-injection are performed or the injection amount and injection timing if performed" and the atmospheric pressure correction process for correcting "either whether or not pre-injection and pilot-injection are performed or the injection amount and injection timing if performed" on the basis of the atmospheric pressure. The fuel injection control unit changes either whether or not the atmospheric pressure correction process is performed or the contents of the atmospheric pressure correction process, depending on cases when the engine state is the steady or transient state.

In the steady state, the fuel injection control unit may correct "either whether or not pre-injection and pilot-injection are performed or the injection amount and injection timing if performed" in accordance with the first correction amount calculated on the basis of the atmospheric pressure. In the transient state, the fuel injection control unit may correct "either whether or not pre-injection and pilot-injection are performed or the injection amount and injection timing if performed" in accordance with the second correction amount calculated on the basis of the atmospheric pressure. The first correction amount and the second correction amount may be different.

In the steady state, the fuel injection control unit may correct "either whether or not pre-injection and pilot-injection are performed or the injection amount and injection timing if performed" calculated in the steady process, in accordance with the correction amount calculated on the basis of the atmospheric pressure. In the transient state, the fuel injection control unit may use "either whether or not pre-injection and pilot-injection are performed or the injection amount and injection timing if performed" calculated in the transient process without using the correction amount based on the atmospheric pressure.

In a case that the engine state is the transient state and the atmospheric pressure detected by the atmospheric pressure sensor is within the predetermined range, the fuel injection control unit may use "either whether or not pre-injection and pilot-injection are performed or the injection amount and injection timing if performed" calculated in the transient process without using the correction amount based on the atmospheric pressure.

In each above-described process, their advantages, disadvantages and usable conditions (such as altitude) are varied. The stability of ignition can be properly improved by using them for different purposes on the basis of priorities and conditions. This proper use may be automatically performed in the ECU 50 side or may be instructed by a user.

As described above, the engine 100 includes the injectors 12, the state determination unit 58, the atmospheric pressure sensor 57 and the injection timing control unit 59. The state determination unit 58 determines whether the engine state is the steady or transient state. The atmospheric pressure sensor 57 detects the atmospheric pressure. The injection timing control unit 59 performs the steady process for calculating the fuel injection timing in the steady state, the transient process for calculating the fuel injection timing in the transient state, and the atmospheric pressure correction process for correcting the fuel injection timing on the basis of the atmospheric pressure. The injection timing control unit 59 changes either whether or not the atmospheric pressure correction process is performed (the first embodiment), or changes the contents of the atmospheric pressure correction process (the second embodiment), depending on cases when the engine state is the steady or transient state.

Conventionally, the same atmospheric pressure correction amount is calculated in both steady state and transient state. It is therefore difficult to avoid either misfire in the steady state or the excess of the pressure in the cylinder over the allowable value in the transient state, however, the adoption of the above-described configuration can avoid the both situations.

Although preferred embodiments of the present invention have been described above, the above-described configuration can be modified, for example, as follows.

Any method is adoptable for determining either steady or transient state. The determination may be performed using any method other than the above-described method.

In the above-described embodiment, the correction amount and the correction coefficient are calculated individually and thereby the atmospheric pressure correction amount is calculated. However, the atmospheric pressure correction amount may be calculated on the basis of only atmospheric pressure, for example.

The configuration of the engine 100 and the process performed by the ECU 50 may be appropriately changed unless otherwise departed from the object of the present invention. For example, the present invention can be applied to a naturally aspirated engine.

DESCRIPTION OF THE REFERENCE NUMERALS 12 injector (fuel injector)
50 ECU
57 atmospheric pressure sensor
58 state determination unit
59 injection timing control unit
61 standard injection timing map
62 atmospheric pressure correction amount map
63 atmospheric pressure correction coefficient curve
66 transient injection timing map

The invention claimed is:
1. An engine comprising:
a fuel injector;
an atmospheric pressure sensor configured to detect an atmospheric pressure; and
an engine controller comprising a first control device and a second control device, and coupled to the fuel injector,
wherein the first control device is configured to determine whether the engine is in a steady state or a transient state,
wherein the second control device is configured to calculate a fuel injection timing in the steady state, a fuel injection timing in the transient state, and an atmospheric pressure correction process for correcting an effect of the atmospheric pressure on the fuel injection timing,
wherein the atmospheric pressure correction process is performed only in the steady state,
wherein the second control device is configured to:
when the engine is in the steady state, correct the calculated fuel injection timing in the steady state in accordance with an atmospheric pressure correction amount calculated, using the atmospheric pressure correction process; and when the engine is in the transient state, use the calculated fuel injection timing in the transient state, and wherein the engine controller is configured to output a final injection timing to the fuel injector.

2. The engine according to claim 1, wherein the atmospheric pressure correction amount is calculated based on the atmospheric pressure detected by the atmospheric pressure sensor, an engine speed, and a fuel injection amount.

3. The engine according to claim 1, wherein the first control device is configured to determine whether the engine is in the steady state or the transient state based on an amount of change of an accelerator position, an amount of change of a fuel injection amount, or an amount of change of an engine speed.

4. The engine according to claim 1, wherein the atmospheric pressure correction amount is generated based on the atmospheric pressure detected by the atmospheric pressure sensor, an engine speed, a fuel injection amount, an atmospheric pressure correction amount map, and atmospheric pressure correction coefficient curve.

5. The engine according to claim 1, wherein the engine controller is configured to perform the atmospheric pressure correction process by being configured to:
apply a standard injection timing map to an engine speed and a fuel injection amount to generate a standard injection timing, wherein the standard injection timing corresponds to the calculated fuel injection timing in the steady state;
apply an atmospheric pressure correction amount map to the engine speed and the fuel injection amount to generate a correction amount;
apply an atmospheric pressure correction coefficient curve to the atmospheric pressure detected by the atmospheric pressure sensor to generate a correction coefficient;
generate the atmospheric pressure correction amount based on integrating the correction amount and the correction coefficient; and
adjust the standard injection timing based on the atmospheric pressure correction amount to generate the final injection timing.

6. The engine according to claim 5, wherein the correction amount is calculated independent of the atmospheric pressure detected by the atmospheric pressure sensor.

7. The engine according to claim 1, wherein the final injection timing is further adjusted based on turbo lag.

8. The engine according to claim 1, wherein the atmospheric pressure correction process is configured to determine whether or not to perform pre-injection, whether or not to perform pilot injection, an adjustment to a fuel injection amount, an adjustment to a fuel injection timing, or a combination thereof.

9. The engine according to claim 1, wherein the atmospheric pressure correction process is configured to increase a pre-injection amount, decrease a pre-injection interval, or both.

10. An engine control system comprising:
an engine controller coupled to a fuel injector of an engine, the engine controller comprising:
a first control device configured to determine whether the engine is in a steady state or a transient state; and
a second control device configured to:
calculate a fuel injection timing in the steady state;
calculate a fuel injection timing in the transient state;
calculate an atmospheric pressure correction amount according to an atmospheric pressure correction process for correcting an effect of atmospheric pressure on the fuel injection timing in the steady state; and
output, to the fuel injector, a final fuel injection timing based on at least one of the fuel injection timing in the steady state, the fuel injection timing in the transient state, or the atmospheric pressure correction amount; and
an atmospheric pressure sensor coupled to the engine controller and configured to detect the atmospheric pressure; and
wherein, when the engine is in the transient state and when the atmospheric pressure detected by the atmospheric pressure sensor is less than or equal to a first threshold and is greater than or equal to a second threshold that is less than the first threshold, the second control device is configured to use the calculated fuel injection timing in the transient state as the final fuel injection timing.

11. The engine control system according to claim 10, further comprising:
the engine including one or more cylinders; and
the fuel injector configured to inject fuel, based on the final fuel injection timing, into a cylinder of the one or more cylinders.

12. The engine control system according to claim 10, wherein, when the engine is in the steady state, the second control device is configured to:
correct the fuel injection timing in the steady state based on the atmospheric pressure correction amount to determine a corrected fuel injection timing in the steady state; and
use the corrected fuel injection timing in the steady state as the final fuel injection timing.

13. An engine control system comprising:
an engine controller coupled to a fuel injector of an engine, the engine controller configured to:
calculate a steady state fuel injection timing;
calculate a transient state fuel injection timing;
calculate an atmospheric pressure correction amount according to an atmospheric pressure correction process for correcting an effect of atmospheric pressure on the steady state fuel injection timing; and
output, to the fuel injector, a final fuel injection timing based on at least one of the steady state fuel injection timing, the transient state fuel injection timing, or the atmospheric pressure correction amount;
wherein the engine controller is further configured to:
when the engine is in a transient state and when the atmospheric pressure is less than or equal to a first threshold and when the atmospheric pressure is greater than or equal to a second threshold, use the calculated transient state fuel injection timing as the final fuel injection timing, wherein the first threshold is greater than the second threshold; and
when the engine is in the transient state and when the atmospheric pressure is greater than the first threshold or the atmospheric pressure is less than the second threshold, correct the fuel injection timing in accordance with a second atmospheric pressure correction process, different from the atmospheric pressure correction process, to generate the final fuel injection timing.

14. The engine control system according to claim 13, wherein:

when the engine is in a steady state, the engine controller is configured to:
  correct the steady state fuel injection timing based on the atmospheric pressure correction amount to determine a corrected steady state fuel injection timing; and
  use the corrected steady state fuel injection timing as the final fuel injection timing.

15. The engine control system according to claim 14, wherein the engine controller is further configured to determine whether the engine is in the steady state or the transient state.

16. The engine control system according to claim 15, wherein the engine controller is configured to determine whether the engine is in the steady state or the transient state based on an amount of change of an accelerator position, an amount of change of a fuel injection amount, or an amount of change of an engine speed.

17. The engine control system according to claim 13, further comprising an atmospheric pressure sensor configured to detect the atmospheric pressure.

18. The engine control system according to claim 17, wherein the engine controller is configured to perform the second atmospheric pressure correction process by being configured to:
  apply a transient injection timing map to an engine speed and fuel injection amount to generate a transient injection timing, wherein the transient injection timing corresponds to the calculated fuel injection timing in the transient state;
  apply a transient atmospheric pressure correction amount map to the engine speed and the fuel injection amount to generate a transient correction amount;
  apply a transient atmospheric pressure correction coefficient curve to the atmospheric pressure detected by the atmospheric pressure sensor to generate a transient correction coefficient;
  generate a transient atmospheric pressure correction amount based on integrating the transient correction amount and the transient correction coefficient; and
  adjust the transient injection timing based on the transient atmospheric pressure correction amount to generate the final fuel injection timing.

\* \* \* \* \*